(12) United States Patent
Kuo et al.

(10) Patent No.: US 7,896,765 B2
(45) Date of Patent: Mar. 1, 2011

(54) BELT TENSION ADJUSTMENT MECHANISM

(75) Inventors: Ping-Hung Kuo, Taoyuan Hsien (TW);
Cheng-Ming Liao, Taoyuan Hsien (TW); Ke-Wei Chen, Taoyuan Hsien (TW); Yu-Pang Chen, Taoyuan Hsien (TW); Chien-Min Chen, Taoyuan Hsien (TW); Hsiu-Hui Chiu, Taoyuan Hsien (TW)

(73) Assignee: Teco Image Systems Co., Ltd., Taoyuan Hsien (TW)

( * ) Notice: Subject to any disclaimer, the term of this patent is extended or adjusted under 35 U.S.C. 154(b) by 156 days.

(21) Appl. No.: 12/024,282

(22) Filed: Feb. 1, 2008

(65) Prior Publication Data
US 2009/0118044 A1      May 7, 2009

(30) Foreign Application Priority Data
Nov. 6, 2007    (TW) .............................. 96141921 A (51) Int. Cl.
*F16H 7/08* (2006.01)
(52) U.S. Cl. ...................................... 474/134; 474/135
(58) Field of Classification Search ......... 474/133–135, 474/137
See application file for complete search history.

(56) References Cited

U.S. PATENT DOCUMENTS

| 2,098,573 | A | * | 11/1937 | Dingle | .................. | 198/814 |
|---|---|---|---|---|---|---|
| 4,861,321 | A | * | 8/1989 | Siegwart, Jr. | ................ | 474/133 |
| 4,997,409 | A | * | 3/1991 | Sonoda et al. | .............. | 474/101 |
| 5,776,025 | A | * | 7/1998 | Labudde et al. | ............. | 474/135 |
| 6,312,352 | B1 | * | 11/2001 | Holland et al. | .............. | 474/113 |
| 6,575,858 | B2 | * | 6/2003 | Green et al. | ................. | 474/133 |
| 2003/0224889 | A1 | * | 12/2003 | Luh | ............................ | 474/134 |
| 2004/0127318 | A1 | * | 7/2004 | Yu et al. | ...................... | 474/134 |

* cited by examiner

*Primary Examiner*—Robert A Siconolfi
*Assistant Examiner*—Anna Momper
(74) *Attorney, Agent, or Firm*—Kirton & McConkie; Evan R. Witt (57) ABSTRACT

The present invention relates to a belt tension adjustment mechanism for use with a device including a main body and a belt pulley set. The belt pulley set includes a belt. The belt tension adjustment mechanism includes a slab, at least two tension pulleys and a fixing element. A tight tension force and a slack tension force are exerted on the opposite sides of the belt to define a tight side and a slack side of the belt when the belt pulley set runs. A counterforce is generated from the tight side of the belt to exert on the tension pulley contacting with the tight side, the slab is moved in response to the counterforce. The slack side of the belt is suppressed by the tension pulley contacting with the slack side such that the slack tension force is adjustable.

14 Claims, 8 Drawing Sheets

BELT TENSION ADJUSTMENT MECHANISM

FIELD OF THE INVENTION

The present invention relates to a belt tension adjustment mechanism, and more particularly to a belt tension adjustment mechanism for use in an office machine.

BACKGROUND OF THE INVENTION

Nowadays, a belt pulley set is widely used in modern office automation equipment, industrial equipment or measurement equipment for transmitting the inner mechanical components. For example, a multifunction peripheral with multiple functions in one structural unit includes a belt pulley set to drive corresponding components for performing the printing, faxing or scanning operation.

Figure 1:
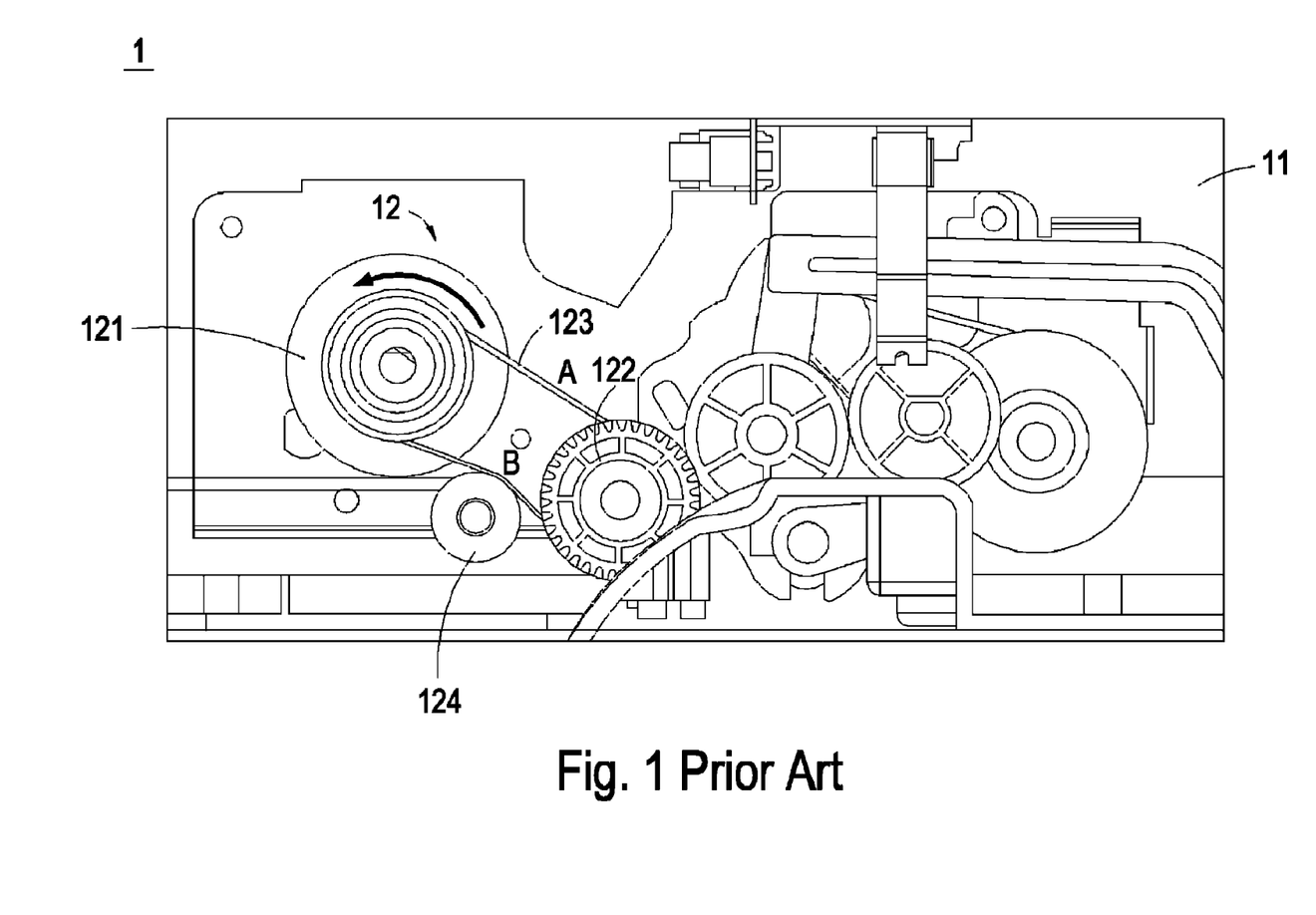
FIG. 1 is a schematic cross-sectional view of a conventional multifunction peripheral.

Referring to FIG. 1, a schematic cross-sectional view of a conventional multifunction peripheral is illustrated. The multifunction peripheral 1 principally includes a main body 11 and a belt pulley set 12. The belt pulley set 12 is disposed inside the main body 11. The belt pulley set 12 includes a driving pulley 121, a follower pulley 122, a belt 123 and a tension pulley 124. The belt 123 is made cyclic and encloses around the driving roller 121 and the follower roller 122. The driving pulley 121 is driven by a power source (e.g. a motor) to rotate. By means of the belt 123, the follower pulley 122 is synchronously rotated with the driving roller 121.

As known, for steadily running the belt pulley set 12, it is necessary to provide sufficient tension force to confine the belt 123 of the tension pulley 124. During the process of inverting the driving roller 121, tension forces are differentially exerted on the sides A and B of the belt 123. Please refer to FIG. 1 again. When the driving roller 121 is rotated in an anti-clockwise direction, a tight-side tension and a slack-side tension are exerted on the sides A and B, respectively. Under this circumstance, a length change is resulted on the side B of the belt 123 and thus the tension force of the belt 123 is insufficient. As a consequence, the precision of feeding the document is reduced and the scanning quality is deteriorated. For providing sufficient tension force to confine the belt 123 and adjusting the length change, the tension pulley 124 is usually arranged on the slack side B of the belt 123.

Since only one tension pulley 124 is arranged on the slack side B of the belt 123, single-side tension adjustment is allowable when the belt pulley set 12 is rotated in a single direction. Nowadays, as the multifunction peripheral has duplex scanning capability to scan or print both sides of the document, the belt pulley set 12 needs to rotate in either the anti-clockwise direction or the clockwise direction. In other words, the slack-side tension is exerted on the side B of the belt 123 when the driving roller 121 is rotated in the anti-clockwise direction, but the slack-side tension is exerted on the side A of the belt 123 when the driving roller 121 is rotated in the clockwise direction. The belt tension adjustment mechanism with the single tension pulley 124 fails to effectively adjust the tension force of the belt 123 in both of the anti-clockwise direction and the clockwise direction. Therefore, the problems of causing low document-feeding precision and deteriorated scanning quality still exist when the multifunction peripheral 1 performs the duplex scanning operation.

In views of the above-described disadvantages resulted from the prior art, the applicant keeps on carving unflaggingly to develop a belt tension adjustment mechanism according to the present invention through wholehearted experience and research.

SUMMARY OF THE INVENTION

It is an object of the present invention to provide a belt tension adjustment mechanism for offering sufficient tension to confine the belt. Therefore, the problems of causing low document-feeding precision and deteriorated scanning quality when the multifunction peripheral performs the duplex scanning operation will be overcome.

In accordance with an aspect of the present invention, there is provided a belt tension adjustment mechanism for use with a device including a main body and a belt pulley set. The belt pulley set includes a belt. The belt tension adjustment mechanism includes a slab, at least two tension pulleys and a fixing element. The slab is mounted on the main body. The tension pulleys are disposed on the slab and contacted with opposite sides of the belt. The fixing element is disposed between the tension pulleys for facilitating the slab to be movably fixed on the main body. A tight tension force and a slack tension force are exerted on the opposite sides of the belt to define a tight side and a slack side of the belt when the belt pulley set runs. A counterforce is generated from the tight side of the belt to exert on the tension pulley contacting with the tight side, the slab is moved in response to the counterforce. The slack side of the belt is suppressed by the tension pulley contacting with the slack side such that the slack tension force is adjustable.

In accordance with an aspect of the present invention, there is provided a belt tension adjustment mechanism for use with a device including a main body and a belt pulley set. The belt pulley set includes a belt. The belt tension adjustment mechanism includes a slab, at least two tension pulleys, a fixing element and a confining element. The slab is mounted on the main body, and includes a gliding slot. The tension pulleys are disposed on the slab and contacted with opposite sides of the belt. The fixing element is disposed between the tension pulleys for facilitating the slab to be movably fixed on the main body. The confining element is movable along the gliding slot for restraining the movable range of the slab. A tight tension force and a slack tension force are exerted on the opposite sides of the belt to define a tight side and a slack side of the belt when the belt pulley set runs. A counterforce is generated from the tight side of the belt to exert on the tension pulley contacting with the tight side. The confining element is moved in response to the counterforce to drive movement of the slab. The slack side of the belt is suppressed by the tension pulley contacting with the slack side so as to perform tension adjustment of the belt.

The above contents of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 2A:
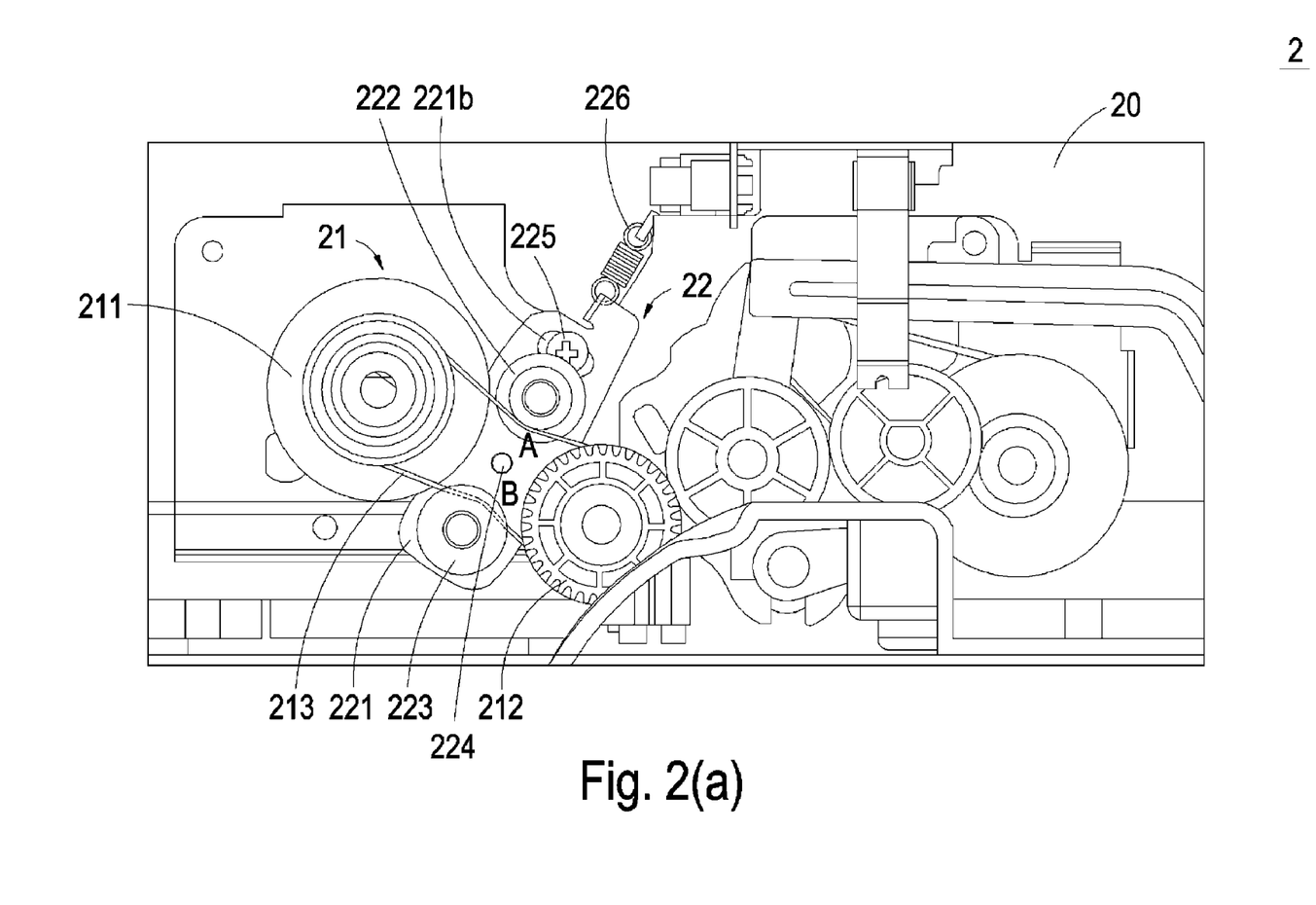
FIG. 2(a) is a schematic cross-sectional view illustrating an office machine having a belt tension adjustment mechanism according to a preferred embodiment of the present invention.

FIG. 2(a) is a schematic cross-sectional view illustrating an office machine having a belt tension adjustment mechanism according to a preferred embodiment of the present invention. The office machine 2 is for example a multifunction peripheral. The multifunction peripheral 2 principally includes a main body 20, a belt pulley set 21 and a belt tension adjustment mechanism 22. The belt pulley set 21 is disposed inside the main body 20. The belt pulley set 21 is controlled by a computer system to drive movement of the components responsible for performing the scanning or printing operations. The belt pulley set 21 includes a driving pulley 211, a follower pulley 212 and a belt 213. The belt 213 is made cyclic and encloses around the driving roller 211 and the follower roller 212. The driving pulley 211 is driven by a power source (e.g. a motor) to rotate. By means of the belt 213, the follower pulley 212 is synchronously rotated with the driving roller 211.

Figure 2B:
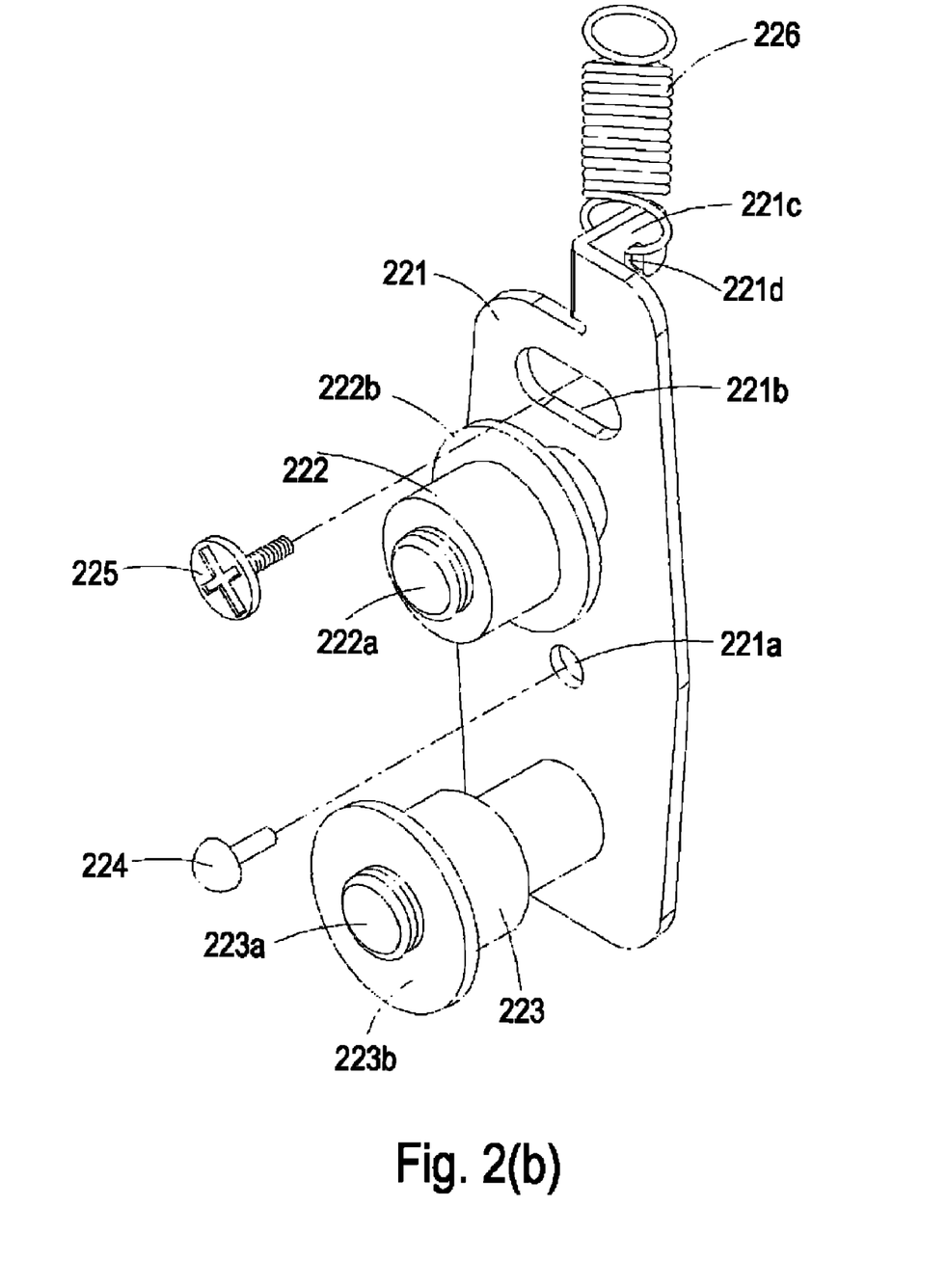
FIG. 2(b) is a schematic perspective view of the belt tension adjustment mechanism according to a first preferred embodiment of the present invention.

Referring to FIG. 2(b), a schematic perspective view of the belt tension adjustment mechanism according to a first preferred embodiment of the present invention is illustrated. Please refer to FIGS. 2(a) and 2(b). The belt tension adjustment mechanism 22 is pivotally mounted on the main body 20 of the office machine 2. The belt tension adjustment mechanism 22 principally includes a slab 221, a first tension pulley 222, a second tension pulley 223 and a fixing element 224. The first tension pulley 222 and the second tension pulley 223 are disposed on the upper side and the lower side of the slab 221, respectively. The first tension pulley 222 and the second tension pulley 223 are sustained against both sides A and B of the belt 213, respectively. The slab 221 further includes a pivotal hole 221a between the first tension pulley 222 and the second tension pulley 223. After the fixing element 224 penetrates through the pivotal hole 221a and is fixed on the main body 20, the slab 221 is pivotally fixed on the main body 20 with the fixing element 224 serving as the pivotal center.

In some embodiments, the slab 221 has a gliding slot 221b near the upper edge thereof such that the first tension pulley 222 is arranged between the gliding slot 221b and the pivotal hole 221a. Corresponding to the gliding slot 221b, the belt tension adjustment mechanism 22 has a confining element 225 (e.g. a screw). After penetrating through the gliding slot 221b, the confining element 225 is fixed on the main body 20. As the slab 221 is swung, the confining element 225 is movable along the gliding slot 221b. Consequently, the swing range of the slab 221 is restrained by the confining element 225 and both ends of the gliding slot 221b.

Please refer to FIG. 2(b) again. An extension part 221c is protruded from and perpendicular to the upper edge of the slab 221. The extension part 221c has an engaging notch 221d. In some embodiments, the belt tension adjustment mechanism 22 further includes a restoring element 226 such as an elastic element (e.g. a spring). A first terminal of the restoring element 226 is coupled with the engaging notch 221d. A second terminal of the restoring element 226 is fixed on the main body 20. In a case that the belt pulley set 21 stops running, the slab 221 will be returned to its initial position (as shown in FIG. 3(a)) due to the elastic restoring force of the restoring element 226.

In some embodiments, the first tension pulley 222 includes a first wheel axle 222a and a first partition plate 222b, and the second tension pulley 223 includes a second wheel axle 223a and a second partition plate 223b. The first wheel axle 222a is arranged at the center of the first tension pulley 222 and pivotally coupled to the slab 221. Likewise, the second wheel axle 223a is arranged at the center of the second tension pulley 223 and pivotally coupled to the slab 221. The first partition plate 222b and the second partition plate 223b are sheathed around the outer peripheries of the first tension pulley 222 and the second tension pulley 223, respectively. In this embodiment, the first partition plate 222b and the second partition plate 223b are arranged in a staggered form. That is, the first partition plate 222b and the second partition plate 223b are not aligned with each other. As a consequence, after the belt 213 is sheathed around the first tension pulley 222 and the second tension pulley 223, the belt 213 will be easily detached from the first tension pulley 222 and the second tension pulley 223.

Figure 3A:
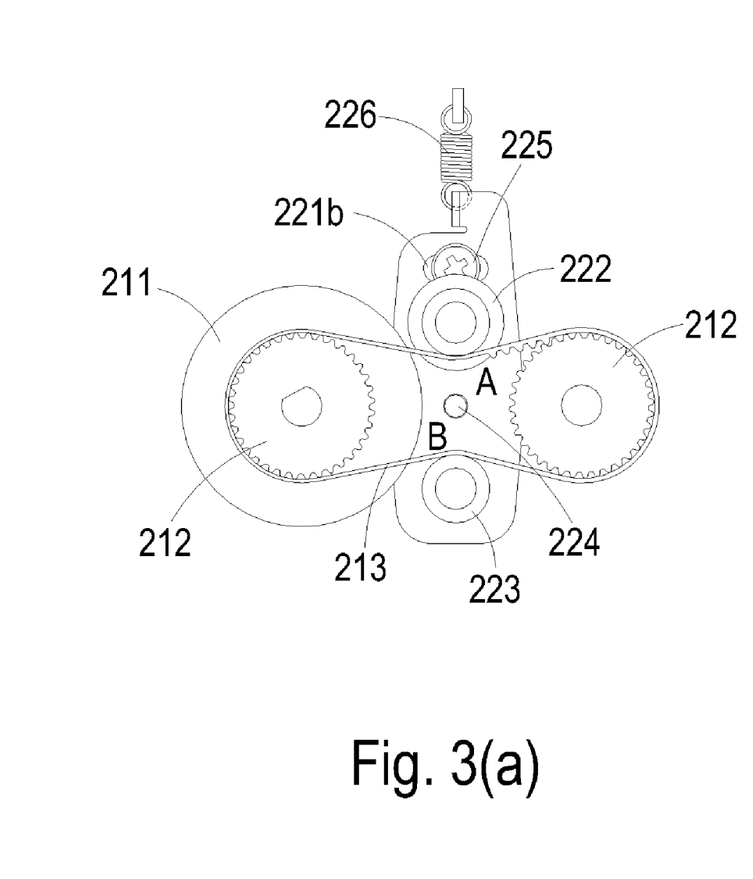
FIGS. 3(a), 3(b) and 3(c) are schematic cross-sectional views illustrating operations of the belt pulley set and the belt tension adjustment mechanism according to the first preferred embodiment.
Figure 3B:
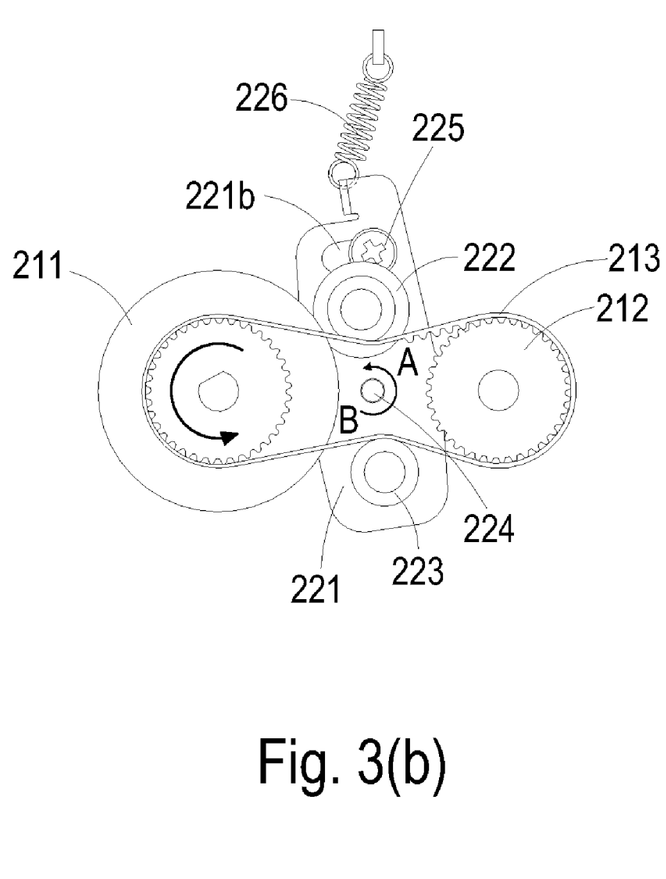
Figure 3C:
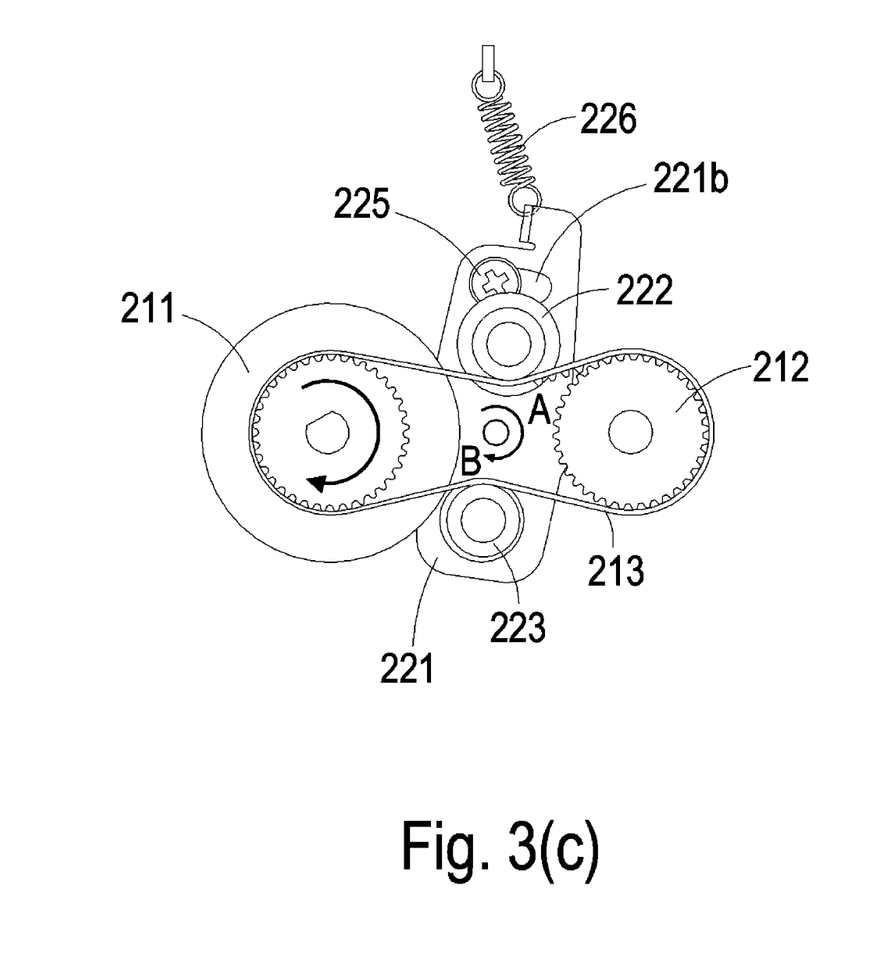

FIGS. 3(a), 3(b) and 3(c) are schematic cross-sectional views illustrating operations of the belt pulley set and the belt tension adjustment mechanism according to the first preferred embodiment. Please refer to FIGS. 3(a), 3(b) and 3(c) and also FIG. 2(a). As shown in FIG. 3(a), before the office machine 2 performs the scanning or printing operation, both sides A and B of the belt 213 are slightly contacted with the first tension pulley 222 and the second tension pulley 223, respectively. Meanwhile, the tension forces exerted on the sides A and B are balanced.

Next, for performing the scanning or printing operation by the office machine 2, the driving roller 211 is driven by the power source (e.g. a motor) to rotate in an anti-clockwise direction. A tight-side tension and a slack-side tension are exerted on the sides A and B of the belt 213, respectively. Under this circumstance, a counterforce generated from the tight side A of the belt 213 is exerted on the first tension pulley 222. Due to the counterforce, the slab 221 is rotated in the anti-clockwise direction with the fixing element 224 serving as the pivotal center. As a consequence, the side B of the belt 213 is suppressed by the second tension pulley 223, so that the tension force exerted on the side B of the belt 213 is adjusted, as can be seen in FIG. 3(b).

On the contrary, in a case that the driving roller 211 is driven by the power source (e.g. a motor) to rotate in a clockwise direction, a slack-side tension and a tight-side tension are exerted on the sides A and B of the belt 213, respectively. Under this circumstance, a counterforce generated from the tight side B of the belt 213 is exerted on the second tension pulley 223. Due to the counterforce, the slab 221 is rotated in the clockwise direction with the fixing element 224 serving as the pivotal center. As the slab 221 is rotated in the clockwise direction, the side A of the belt 213 is suppressed by the first tension pulley 222, so that the tension force exerted on the side A of the belt 213 is adjusted, as can be seen in FIG. 3(c).

In a case that the scanning or printing operation is terminated, the slab 221 will be returned to its initial position (as shown in FIG. 3(a)) due to the elastic restoring force of the restoring element 226. Regardless of whether the slab 221 is swung in the anti-clockwise or clockwise direction, the swing range of the slab 221 is restrained by the confining element 225 and both ends of the gliding slot 221b.

In some embodiments, after the slab 221 is moved to a proper position (as shown in FIG. 3(b) or 3(c)) to achieve desired tension forces exerted on both sides A and B of the belt 213 by the first tension pulley 222 and the second tension pulley 223, the slab 221 may be securely fixed on the main body 20 of the office machine 2 by the confining element 225. As a consequence, desired tension forces exerted on both sides A and B of the belt 213 by the first tension pulley 222 and the second tension pulley 223 even if the office machine performs the singlet or duplex scanning operation to scan or print one or both sides of the document.

Figure 4:
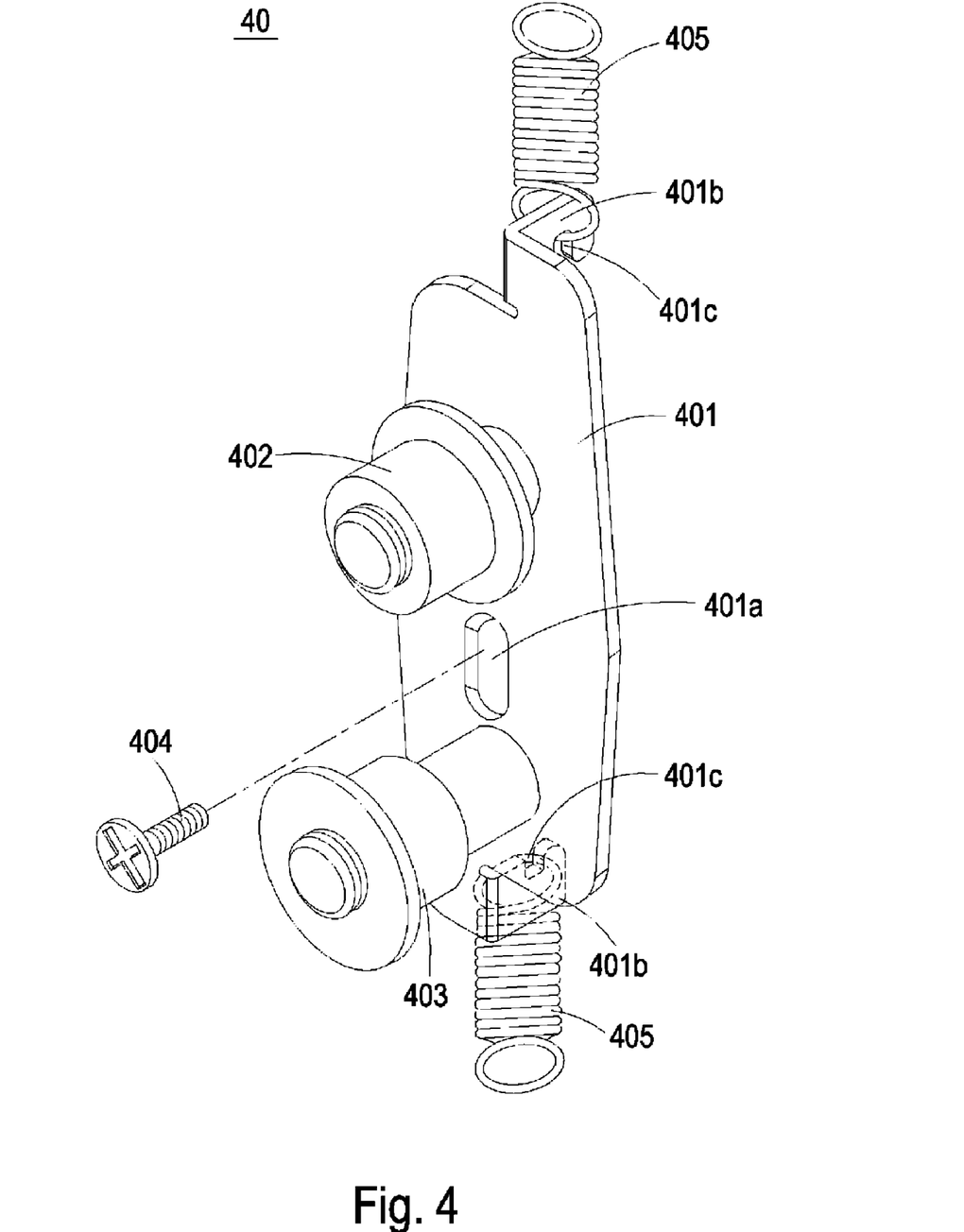
FIG. 4 is a schematic perspective view of a belt tension adjustment mechanism according to a second preferred embodiment of the present invention.

Referring to FIG. 4, a schematic perspective view of a belt tension adjustment mechanism according to a second preferred embodiment of the present invention is illustrated. Please refer to FIG. 4 and also FIG. 2(a). The belt tension adjustment mechanism 40 principally includes a slab 401, a first tension pulley 402, a second tension pulley 403 and a fixing element 404. The first tension pulley 402 and the second tension pulley 403 are disposed on the upper side and the lower side of the slab 401, respectively. The slab 401 has a gliding slot 401a between the first tension pulley 402 and the second tension pulley 403. The first tension pulley 402 and the second tension pulley 403 are sustained against both sides A and B of the belt 403, respectively. A first end of the fixing element 404 penetrates through the gliding slot 401a of the slab 401 and is fixed on the main body 20. A second end of the fixing element 404 is contacted with the slab 401. As a consequence, the slab 401 is movable upwardly or downwardly along the gliding slot 401a such that the movable range of the slab 221 is restrained by the fixing element 404 and both ends of the gliding slot 401a.

Please refer to FIG. 4 again. Two extension parts 401b are protruded from and perpendicular to the upper and lower edged of the slab 401. The extension parts 401b have respective engaging notches 401c. In some embodiments, the belt tension adjustment mechanism 40 further includes two restoring elements 405 such as elastic elements (e.g. springs). A first terminal of each restoring element 405 is coupled with a corresponding engaging notch 401c. A second terminal of the restoring element 405 is fixed on the main body 20. In a case that the scanning or printing operation by the office machine is terminated, the slab 401 will be returned to its initial position (as shown in FIG. 5(a)) due to the elastic restoring forces of the restoring elements 405.

Figure 5A:
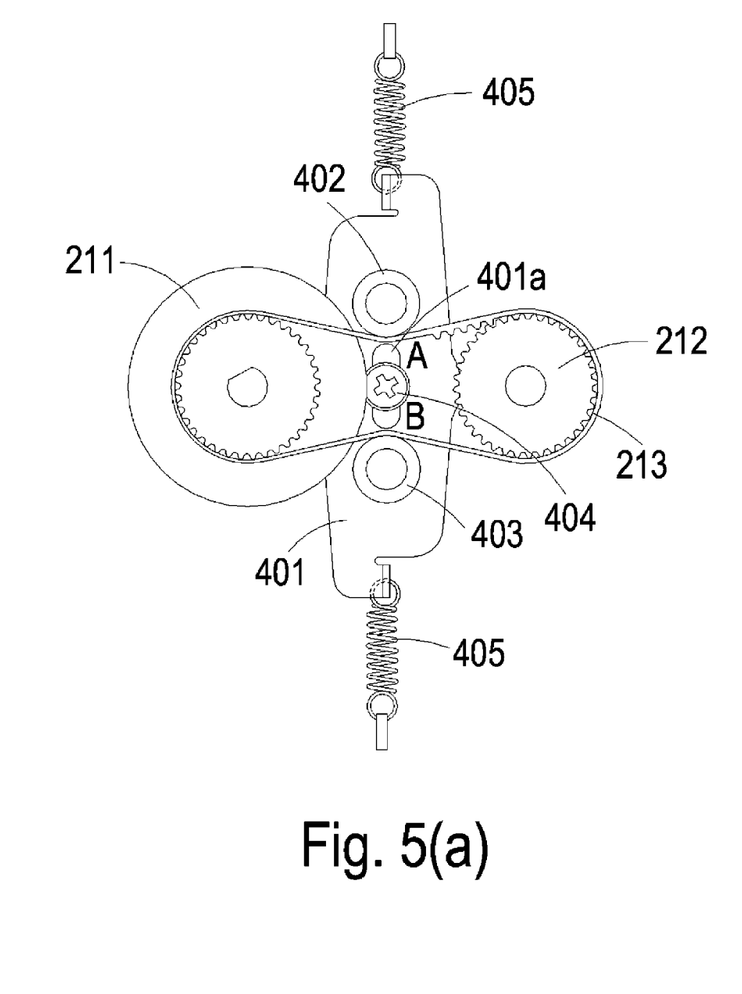
FIGS. 5(a), 5(b) and 5(c) are schematic cross-sectional views illustrating operations of the belt pulley set and the belt tension adjustment mechanism according to the second preferred embodiment.
Figure 5B:
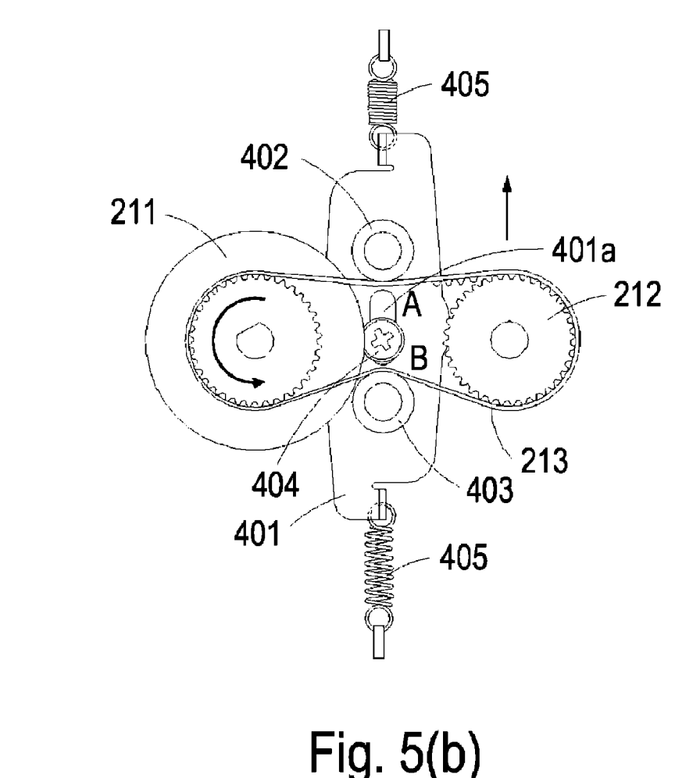
Figure 5C:
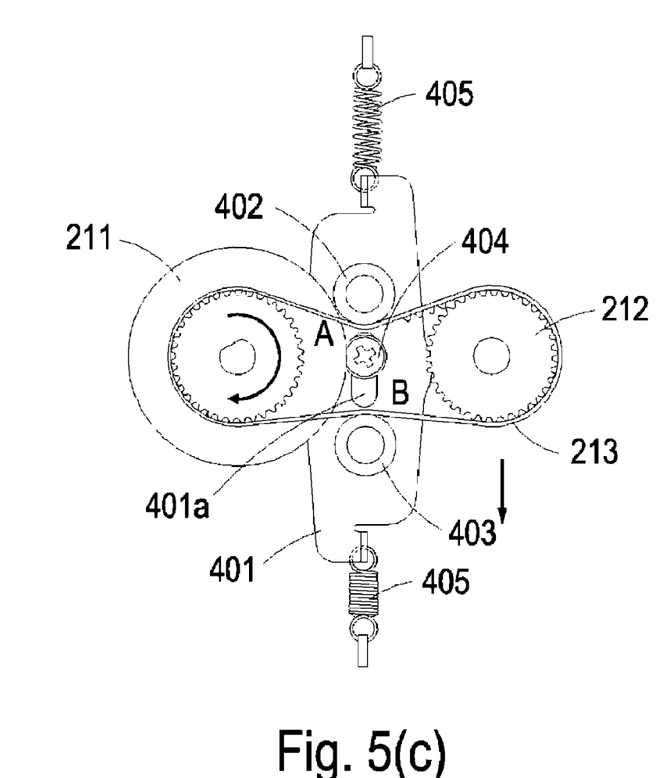

FIGS. 5(a), 5(b) and 5(c) are schematic cross-sectional views illustrating operations of the belt pulley set and the belt tension adjustment mechanism according to the second preferred embodiment. Please refer to FIGS. 5(a), 5(b) and 5(c) and also FIG. 2(a). As shown in FIG. 5(a), before the office machine 2 performs the scanning or printing operation, both sides A and B of the belt 213 are slightly contacted with the first tension pulley 412 and the second tension pulley 413, respectively. Meanwhile, the tension forces exerted on the sides A and B are balanced.

Next, for performing the scanning or printing operation by the office machine 2, the driving roller 211 is driven by the power source (e.g. a motor) to rotate in an anti-clockwise direction. A tight-side tension and a slack-side tension are exerted on the sides A and B of the belt 213, respectively. Under this circumstance, a counterforce generated from the tight side A of the belt 213 is exerted on the first tension pulley 402. Due to the counterforce, the slab 401 is moved upwardly. As a consequence, the side B of the belt 213 is suppressed by the second tension pulley 403, so that the tension force exerted on the side B of the belt 213 is adjusted, as can be seen in FIG. 5(b). Meanwhile, the restoring element 405 above the slab 401 is compressed but the restoring element 405 under the slab 401 is stretched.

On the contrary, in a case that the driving roller 211 is driven by the power source (e.g. a motor) to rotate in a clockwise direction, a slack-side tension and a tight-side tension are exerted on the sides A and B of the belt 213, respectively. Under this circumstance, a counterforce generated from the tight side B of the belt 213 is exerted on the second tension pulley 403. Due to the counterforce, the slab 401 is moved downwardly. As a consequence, the side A of the belt 213 is suppressed by the first tension pulley 402, so that the tension force exerted on the side B of the belt 213 is adjusted, as can be seen in FIG. 5(c). Meanwhile, the restoring element 405 under the slab 401 is compressed but the restoring element 405 above the slab 401 is stretched. In a case that the scanning or printing operation is terminated, the slab 401 will be returned to its initial position (as shown in FIG. 5(a)) due to the elastic restoring force of the restoring element 405 above or under the slab 401.

From the above description, the belt tension adjustment mechanism of the present invention is capable of providing sufficient tension to confine the belt. When the driving pulley of the belt pulley set is rotated, the slab is movable due to the counterforce generated from the tight side of the belt. Meanwhile, the slack side of the belt is suppressed by the tension pulley contacted with the slack side, so that the tension force exerted on the slack side of the belt is adjustable. Optionally, after the slab is moved to a proper position to achieve desired tension forces on both sides of the belt, the slab may be securely fixed on the main body of the office machine by the confining element. Therefore, the problems of causing low document-feeding precision and deteriorated scanning quality when the multifunction peripheral performs the duplex scanning operation will be overcome.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A belt tension adjustment mechanism for use with a device including a main body and a belt pulley set, said belt pulley set including a belt, a driving pulley and a follower pulley, said belt tension adjustment mechanism comprising:
   a slab mounted on said main body and has a pivotal hole and a gliding slot;
   at least two tension pulleys disposed on said slab and contacted with opposite sides of said belt, wherein one of said at least two tension pulleys is arranged between said pivotal hole and said gliding slot, and said pivotal hole is disposed between said driving pulley and said follower pulley; and
   a fixing element penetrated through said pivotal hole and disposed between said at least two tension pulleys for facilitating said slab to be movably fixed on said main body,
   a confining element, which is moveable along said gliding slot for restraining the movable range of said slab,
   wherein a tight tension force and a slack tension force are exerted on said opposite sides of said belt to define a tight side and a slack side of said belt when said belt pulley set runs, wherein a counterforce is generated from said tight side of said belt to exert on said tension pulley contacting with said tight side, said slab is moved in response to said counterforce, and said slack side of said belt is suppressed by said tension pulley contacting with said slack side such that said slack tension force is adjustable.

2. The belt tension adjustment mechanism according to claim 1 wherein said device is an office machine.

3. The belt tension adjustment mechanism according to claim 1 wherein said confining element is a screw.

4. The belt tension adjustment mechanism according to claim 1 wherein an extension part is protruded from and perpendicular to an upper edge of said slab, and includes an engaging notch.

5. The belt tension adjustment mechanism according to claim 4 further including a restoring element, which has a first terminal coupled with said engaging notch and second terminal fixed on the main body, wherein said slab is returned to an initial position of said slab due to a restoring force of said restoring element when said belt pulley set stops running.

6. The belt tension adjustment mechanism according to claim 5 wherein said restoring element is a spring.

7. The belt tension adjustment mechanism according to claim 1 wherein said tension pulleys have respective wheel axles at the centers thereof such that said tension pulleys are rotatably mounted on said slab.

8. The belt tension adjustment mechanism according to claim 1 wherein said tension pulleys have respective partition plates sheathed around the outer peripheries of said tension pulleys for positioning said belt on said tension pulleys.

9. A belt tension adjustment mechanism for use with a device including a main body and a belt pulley set, said belt pulley set including a belt, a driving pulley and a follower pulley, said belt tension adjustment mechanism comprising:

a slab mounted on said main body, and including a gliding slot and a pivotal hole;

at least two tension pulleys disposed on said slab and contacted with opposite sides of said belt, wherein one of said at least two tension pulleys is arranged between said pivotal hole and said gliding slot, and said pivotal hole is disposed between said driving pulley and said follower pulley;

a fixing element penetrated said pivotal hole and disposed between said at least two tension pulleys for facilitating said slab to be movably fixed on said main body; and a confining element penetrated through said gliding slot for restraining the movable range of said slab, wherein a tight tension force and a slack tension force are exerted on said opposite sides of said belt to define a tight side and a slack side of said belt when said belt pulley set runs, wherein a counterforce is generated from said tight side of said belt to exert on said tension pulley contacting with said tight side, said confining element is moved in response to said counterforce to drive movement of said slab, and said slack side of said belt is suppressed by said tension pulley contacting with said slack side so as to perform tension adjustment of said belt.

10. The belt tension adjustment mechanism according to claim 9 wherein said device is an office machine.

11. The belt tension adjustment mechanism according to claim 9 wherein an extension part is protruded from and perpendicular to an upper edge of said slab, and includes an engaging notch.

12. The belt tension adjustment mechanism according to claim 9 further including a restoring element, which has a first terminal coupled with said engaging notch and second terminal fixed on the main body, wherein said slab is returned to an initial position of said slab due to a restoring force of said restoring element when said belt pulley set stops running.

13. The belt tension adjustment mechanism according to claim 12 wherein said restoring element is a spring.

14. The belt tension adjustment mechanism according to claim 9 wherein said confining element is a screw.

* * * * *